United States Patent [19]

Raffel et al.

[11] 4,282,508
[45] Aug. 4, 1981

[54] ELECTRICAL SIGNAL INTERCONNECTION COUPLER

[75] Inventors: Bernard D. Raffel, Akron; John M. Bowyer, Copley, both of Ohio

[73] Assignee: Goodyear Aerospace Corporation, Akron, Ohio

[21] Appl. No.: 144,754

[22] Filed: Apr. 28, 1980

[51] Int. Cl.³ .............................................. B60C 23/00
[52] U.S. Cl. ................................. 340/52 R; 340/27 R; 340/58; 340/682
[58] Field of Search ................... 340/52 R, 52 F, 58, 340/27 R, 671, 679, 682

[56] References Cited

U.S. PATENT DOCUMENTS

| | | | |
|---|---|---|---|
| 2,063,452 | 12/1936 | McDonnell | 340/58 |
| 2,797,273 | 6/1957 | Brodsky | 340/58 |
| 2,966,650 | 12/1960 | Earnest | 340/58 |
| 4,063,786 | 12/1977 | Rall | 340/682 |
| 4,151,655 | 5/1979 | Makarainen | 340/58 |

*Primary Examiner*—Alvin H. Waring
*Attorney, Agent, or Firm*—P. E. Milliken; L. A. Germain

[57] ABSTRACT

A conductor for transmitting an electrical signal from a signal generator on a rotating member to a signal detector on a relatively stationary member across the motion interface between the two members comprises at least one solid carbon graphite ring mounted coaxially between the two members and having a first annular surface in intimate contact with a mating conductive surface on the signal generator and having a second annular surface in intimate contact with a mating conductive surface on the stationary member that is electrically connected to the signal detector, said carbon graphite ring functioning as an electrical interconnection between the two members.

8 Claims, 3 Drawing Figures

ELECTRICAL SIGNAL INTERCONNECTION COUPLER

BACKGROUND OF THE INVENTION

This invention generally relates to electrical signal transmission and more particularly to conductors that may be applied to the transmission of power and/or information signals from one member rotating with respect to another member.

In the field of monitoring for a condition occurrence on a first member rotating with respect to a second member, the motion interface between the two members has always posed a particular signal transmission problem. Solution of the problem in some applications involved elaborate mechanical configurations of carbon brushes contacting metal rings and in other applications involved electrical coupling techniques including inductive, capacitive and/or impedance coupling configurations. While these techniques have met with success in various limited applications they have not been entirely successful in vehicle applications wherein extremes of pressure, temperature, and/or corrosion are experienced. For example, in an aircraft type application wherein it is desired to transmit low power signals indicative of a particular monitored condition on a wheel to a signal detector mounted on the landing gear strut, the motion interface between the wheel and axle poses a particular difficult signal transmission environment. While various type low noise slip rings are known and used in the electronics arts, their use in an aircraft type application and especially as it pertains to the transmission of signals across a wheel/axle interface is prohibited by reason of the following considerations:

(a) The lifetime of a precision low noise slip ring is directly proportional to its diameter. For example, a 0.7 mm shaft would have a 50,000 mile running lifetime (approx. 10 yrs) while a slightly larger 10 mm shaft would be limited to 5,000 mile running lifetime (approx. 1 yr). In the aircraft application of interest the shafts must be capable of load bearing and therefore of necessity are of the larger diameter and in the range of the low lifetime slip ring. A 5,000 mile one year lifetime cannot be tolerated in the aircraft application.

(b) The standard slip rings used in low noise signal processing applications are vulnerable to a plating type failure mechanism known as polymer buildup. The hydraulic fluids and bearing lubricants commonly found in the aircraft type application of interest adversely react with the precious metal platings on the conventional low noise slip rings to produce polymer films which lead to short term wear and other failure mechanisms.

(c) State of the art slip rings used to send low level signals exhibit optimum operation when rotating, and are subject to oxidation and insulation problems when stationary. The high accelerations in an aircraft application at touchdown adversely affect such standard slip rings. This acceleration problem is accentuated when the slip rings are also subjected to hostile temperature, humidity and the contaminated environment of the aircraft wheel assembly. The normal aircraft wheel sees impact forces to 100 G's vertical and ±15 G's side loading with rotational forces resulting from accelerations to 250 mph in one quarter rotation. A slip ring bounce or breakaway would create an unacceptable error signal.

It is the purpose of this invention therefore, to provide a rotating type conductor that is not limited by shaft diameter and is substantially insensitive to environmental conditions while providing a low noise transmission path that is effective for low power signal detection between the two relatively moving members.

SUMMARY OF THE INVENTION

A conductor for transmitting an electrical signal from signal generating means on a rotating member to signal detecting means on a relatively stationary member across the motion interface between the two members comprises at least one solid carbon graphite ring mounted coaxially between the two members and having a first annular surface in intimate contact with a mating conductive surface on the rotating member that is electrically connected to the signal generating means and having a second annular surface in intimate contact with a mating conductive surface on the stationary member that is electrically connected to the signal detecting means, said carbon graphite ring functioning as an electrical interconnection between the two members.

DETAILED DESCRIPTION OF THE INVENTION

Figure 1:
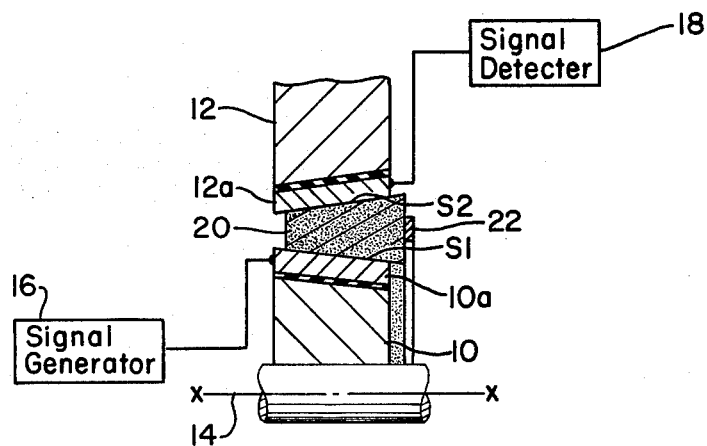
FIG. 1 is a partial elevational view, in section, illustrating a mounting configuration for the inventive concept comprising the invention.

FIG. 1 illustrates the application of the invention wherein a first member 10 is mounted with respect to a second member 12, one or the other being mounted for rotation about an x—x axis 14. For the purpose of this discussion it will be assumed that the member 10 is a rotating member while the member 12 is relatively stationary with respect to the member 10. In this configuration signal generating means 16 are mounted on the rotating member 10 while signal detecting means 18 are mounted on the stationary member 12. In accordance with this invention therefore, and to facilitate transmission of an electrical signal from the signal generator 16 on the rotating member 10 to the signal detector 18 on the stationary member 12, a solid carbon graphite ring 20 is mounted between the two members. As illustrated in the drawing, the graphite is in the configuration of a ring mounted coaxially with respect to the two members 10, 12 such that intercontacting surfaces S1 and S2 are evident between the graphite ring 20 and the two members. While solid graphite rings are known and have been applied to bearing applications the graphite of the instant invention is not intended to operate in the manner of a bearing. The loading on the intercontacting surfaces S1 and S2 is just sufficient to insure a good electrical connection between the ring 20 and the respective conductive elements 10a and 12a of the members 10 and 12. Therefore, and to insure this contact, a load spring in the form of a wave spring washer 22 or the like is mounted to effect an axial force on the annular surface contact areas S1, S2.

Figure 2:
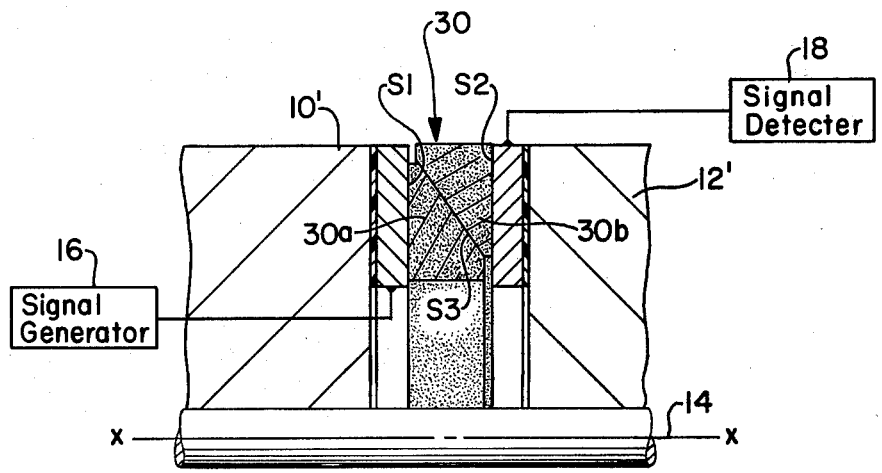
FIG. 2 is a partial elevational view, in section, similar to FIG. 1 illustrating a second mounting configuration for the inventive concept.
Figure 3:
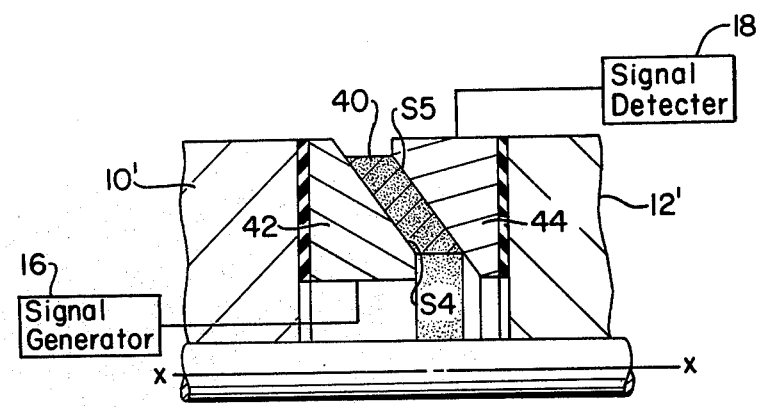
FIG. 3 is a partial elevational view, in section, similar to FIG. 2 illustrating a third mounting configuration for the inventive concept.

While FIG. 1 illustrates the application of the invention to a vertical arrangement of members 10 and 12, FIGS. 2 and 3 illustrate the application to a horizontal arrangement. Referring to FIG. 2, a rotating member 10' is mounted coaxially with respect to a relatively stationary second member 12', the member 10' carrying signal generator means 16 while the member 12' carries signal detector means 18. In this configuration at least one carbon graphite ring generally indicated by reference numeral 30 is interposed between the two members 10', 12' such that intercontacting surface areas S1 and S2 are evident between the members and the ring. Of course it is anticipated that either one or both of the members 10', 12' may be spring loaded such that an axial force is distributed over the contacting surface areas that exist between the members and the graphite ring 30. It is also anticipated that the carbon graphite ring 30 may be in the configuration of multiple rings 30a and 30b. The rings 30a and 30b may be allowed to freely rotate and in this circumstance at least three contacting surfaces S1, S2 and S3 are evident between the member conductors 10a,12a and the graphite. In operation, the sliding contact may initially involve surfaces S1 and/or S2 ie. the contact as between the metal conductors 10a and 12a and the graphite rings 30a and 30b respectively. However, in the course of rotational operation these may become stationary contact surfaces and the result being a sliding contact surface as between graphite and graphite at S3. In either case electrical continuity is maintained and signal transmission between the signal generator 16 and the signal detector 18 is continued.

In FIG. 3 an alternative configuration is shown wherein a carbon graphite conical ring 40 is supported between connectors 42 and 44 and electrical contact exists at surfaces S4 and S5. A means (not shown) is also provided as in the other configurations to exert an axial force such that a total annular surface contact area exists between the graphite 40 and the connector rings 42,44. In this configuration the graphite ring is a freely rotating connector for the maintenance of electrical continuity between the signal generator 16 and signal detector 18.

With respect to the carbon graphite used there are several wear mechanisms that greatly influence the selection of the material composition. In an aircraft application the flight profile on a global basis provides for environmental variations ranging from hot-dry to cold-wet. Studies that have been conducted would suggest significant wear when dry due to friction and significant crumbling when moist. The solutions to either problem have historically yielded brittle materials vulnerable to shock and vibration. Extensive laboratory data and recent flight test data which are outside the scope of this invention indicate that proper compositions and configurations for the carbon graphite are available to solve these problems. It will be appreciated however that even when the graphite is of a brittle composition the instant invention provides a mounting configuration that totally supports the graphite about its annular contacting surfaces.

Thus, this invention provides a rotating electrical connector that is adapted for the harsh environment of vehicle applications and more particularly to aircraft applications. It further provides a rotating connector that may be mounted on shafts that exceed 5 mm diameter to obtain a running lifetime commensurate with aircraft type applications.

While certain representative embodiments and details have been shown for the purpose of illustrating the invention, it will be apparent to those skilled in the art that various changes and modifications may be made therein without departing from the spirit or scope of the invention.

What is claimed is:

1. A conductor for transmitting an electrical signal from generating means on a rotating member to detecting means on a relatively stationary member across the motion interface between the two members comprises at least one carbon graphite ring having an annular contact surface in intimate contact with a complimentary and mating annular conductive surface on the rotating member and a second annular surface in intimate contact with a complimentary and mating annular conductive surface on the stationary member said complimentary and mating annular conductive surfaces on the rotating and stationary members being electrically connected to the generating and detecting means respectively and said graphite ring functioning as an electrical interconnection between the two members.

2. The conductor as set forth in claim 1 wherein the graphite ring comprises at least two rings having mating contacting annular surfaces between them.

3. The conductor as set forth in claim 1 wherein the contacting surfaces are substantially of a conical configuration.

4. The conductor as set forth in claim 2 wherein the graphite rings have complimentary and mating conical contacting surfaces.

5. The conductor as set forth in claim 1 wherein the conductor is mounted to a shaft having a diameter greater than 5 mm.

6. The conductor as set forth in claim 1 wherein the rotating and stationary members are vertically oriented with respect to each other and the graphite ring is interposed between them.

7. The conductor as set forth in claim 1 wherein the rotating and stationary members are horizontally oriented and the graphite ring is interposed between them.

8. The conductor as set forth in claim 7 wherein the graphite is a conically shaped ring and the rotating and stationary members carry metal electrical connectors that have complimentary surfaces that are in intimate contact with the graphite ring about its annular contacting surface areas.

* * * * *